Patented Dec. 21, 1948

2,457,097

UNITED STATES PATENT OFFICE 2,457,097

POLYMERIC COMPOSITION AND METHOD OF MAKING SAME

Theodore A. Te Grotenhuis, Olmsted Falls, Ohio

No Drawing. Application October 21, 1944, Serial No. 559,848

14 Claims. (Cl. 260—29.7)

This invention is a continuation-in-part of my applications Serial No. 424,493, filed December 26, 1941, now abandoned, Serial No. 470,802, filed Dec. 31, 1942, now abandoned, and Serial No. 527,929, filed March 24, 1944. The invention relates to pneumatic tires having heterogeneous treads, compounds for preparing tire treads, and to a method of preparing the same. It particularly relates to compounds suitable for tread portions of vehicle tires and the like and to a method of preparing such compounds.

A large number of polymeric materials which are vulcanizable to a resilient state generally characteristic of soft vulcanized rubber have heretofore been proposed. In most of these polymers a very few properties are outstanding. Thus, one rubbery polymer may, particularly in its unmasticated state, have exceptionally high abrasion resistance yet it may crack badly and have very poor flexing properties. Another rubbery polymer may have exceptional anticracking and flexing properties yet have only mediocre abrasion resistance. When blends of various rubbery materials are made in accordance with usual rubber compounding practice of blending rubber stocks of the same plasticity so that a homogeneous mixture is obtained, the exceptionally desirable properties of each of the rubbers are not maintained in the compound formed.

It is an object of the present invention to provide compounds vulcanizable to a soft rubbery state and embodying the superior properties of two or more rubber compounds or rubbery polymers so that one having superior flexing resistance and lowest heat build-up is in a continuous phase or matrix and another of superior abrasion resistance is in a disperse phase.

It is another object of the present invention to provide a vulcanizable rubberlike material characteristic of soft vulcanizable rubber containing dispersed vulcanizable synthetic rubber compound which, when vulcanized, has abrasion resistance superior to that of vulcanized Hevea rubber, containing the same quantity of added compounding agents and containing another rubberlike material, also vulcanizable to a resilient material characteristic of soft vulcanized rubber, and having other predominant characteristics, such as greater processability or resistance to flex-cracking.

In a homogeneous solid mixture or compound to be formed by conventional methods into tire treads and the like, all portions of the compound have to be masticated to increase their plasticity sufficiently so that the compound has the necessary processability. Mastication, as is well-known, causes great loss in some of the most desirable properties of rubbers and rubbery polymers. Abrasion resistance may for example be reduced by mastication as much as 40% or 50%.

It is therefore a primary object of the present invention to provide a compound vulcanizable to provide resilience similar to that of vulcanized rubber, which may be formed in a desired shape and yet which retains the advantageous properties of a rubber or rubbery polymer which has not been deteriorated by mastication.

Even though synthetic rubber compounds have relatively high abrasion resistance, they are often more expensive than are natural rubber compounds and in some cases they have a high hysteresis loss, so it is not always desirable to utilize them in tire carcasses, etc. where they are subjected to a large amount of flexing. But, it may be more desirable to make a portion of a tire, for example a tread portion, of a compound having the high wear resistance of synthetic rubber and another portion of the article, such as a tire carcass, of an ordinary Hevea rubber compound. Difficulty is sometimes experienced, however, in obtaining good adhesion of compounded synthetic rubber to the compounded natural rubber.

It is, therefore, a further object of the present invention to provide an abrasion-resistant tread portion or tread for a tire, which tread portion or tread contains a reinforced, vulcanizable rubberlike polymer to provide increased wear resistance and which is adherent to compounds of Hevea rubber suitable for use in constructing a tire carcass.

The above and other objects, apparent from the following description, are accomplished by mixing two rubbery materials in such a way as to produce a heterogeneous compound, preferably having particles of a relatively tough, unmasticated rubbery polymer as a disperse phase and a relatively plastic, flexible, vulcanizable rubbery polymer as a matrix or connecting ingredient. To obtain all of the prime objects of the present invention, especially abrasion resistance, most suitable for tire treads, at least one and preferably both of the phases necessarily contain a substantial amount (generally at least 20% or 25% based on the rubbery material) of carbon black in intimate association with the rubbery materials thereof. The carbon black improves properties such as wear resistance and/or tensile strength. Both the disperse phase and the matrix compound have, when vulcanized, a resilience or flexibility generally similar to or characteristic of a soft vulcanized rubbery compound.

The suspended or dispersed particles of rubbery polymer preferably constitute a substantial proportion of the heterogeneous compound; they preferably have relatively high nerve or elasticity similar to particles which have not been broken-down by mastication and, because of their long molecular structure, they tend to resist abrasion more than do broken-down rubbery polymers of the same composition. Dispersed particles therefore serve to take a large proportion of the abrasion in a vulcanized article, such for example as a tire tread or portion thereof, formed from the plastic heterogeneous mixture. Also, because of their toughness or because of the heterogeneous nature of the rubbery compound, the particles of the disperse phase also seem to act as stops of crack-growths in the matrix composition. This is particularly important in treads of vehicle tires where crack-growth is a major problem.

In accordance with the present invention, the relatively tough disperse phase of the heterogeneous compound is distributed within a flexible, vulcanizable rubbery matrix or binding ingredient by mixing a plurality of latices of rubbery polymers adapted to serve as a main source of the rubbery material of the composition. The latices which comprise dispersions of rubbers or rubbery polymers of different character or plasticity may be compounded with curing agents, pigments and the like prior to admixture, or compounding agents may be incorporated in the mixed latices, or they may even be incorporated by mastication into the coagulum formed from the mixed latices. Especially when the heterogeneous compound is to be masticated prior to use, the rubbery globules or coagula formed therefrom of at least one of the latices used in forming the mixture should have substantially different plasticity characteristics from those of the others.

The differential in plasticity or elasticity may be obtained by (a) polymerizing the monomeric materials desired for the disperse phase under conditions such that a tough rubbery polymer is produced and utilizing as the rubbery material desired for the matrix composition a more plastic polymer, as produced in conventional manner, so that upon masticating a coagulum of the latex mixture the breakdown or plasticization will occur primarily in the most plastic or readily masticated material; and/or (b) polymerizing or otherwise incorporating a relatively large amount of carbon black in intimate association with the rubber particles of at least one of the latices forming the admixture.

Latices of relatively tough rubbery polymers may be prepared by polymerizing monomeric materials to relatively high yield in the absence of or with relatively small amounts of modifying agents, such as dodecyl mercaptan, 3B-mercaptan and other long-chain mercaptans or equivalent modifiers. They may also be produced by selecting copolymerizing agents which tend to produce relatively less plastic rubbery polymers. As described in my copending application Serial No. 470,802, the mixture of such a highly cross-linked latex, i. e. one polymerized in the absence of a modifier or plasticity-controlling medium, such as lauryl mercaptan, with a latex of a more plastic polymer (relatively noncross-linked) such as that produced with a substantial amount of such a plasticity-controlling or modifying agent and polymerized to relatively low yield, such as below 70% or so, or even with a natural latex, readily produces a heterogeneous mixture having desirable properties.

Latices prepared by incorporating carbon black with the monomeric material before or during polymerization, as set forth in my prior application Serial No. 527,929, are especially desirable for the disperse phase of the heterogeneous compounds. As set forth in the above-mentioned application, such latices may be prepared by dispersing finely divided carbon in an unemulsified, polymerizable liquid, such for example as one which comprises conjugated dienes selected from the group consisting of homologues and analogues of butadiene. The dispersion thus produced is emulsified in a liquid immiscible therewith under conditions forming an oil-in-water type emulsion, and polymerized in emulsion form.

By combining substantial proportions of a latex of a rubbery polymer containing carbon black polymerized with the monomer so as to be in intimate association with or preferably within the rubbery globules, and a natural latex or a latex of a rubbery polymer polymerized in the absence of substantial amounts of carbon black, with or without modifying agents, one may readily obtain upon coagulation a heterogeneous compound having especially desirable properties. This is particularly so when desired compounding agents are incorporated into at least one of the latices prior to coagulation, preferably prior to admixture, so that mastication is not thereafter required. The coagulum produced from such a compounded mixture may be extruded directly by injecting a mass at relatively high pressure through relatively small orifices into an injection mold.

A disperse phase of rubberlike material as well as the matrix of the plastic compositions of the present invention, as described herein, may be formed from any material or materials which after vulcanization (preferably by sulfur or equivalent vulcanizing agent) have resilience and resistance to plastic flow generally characteristic of soft vulcanized rubbers. But, preferably, rubberlike materials reinforced by carbon black when masticated therein should be used. Other elastomers, particularly sulfur-vulcanizable synthetic elastomers and other vulcanizable elastomers, as defined in the artice by H. L. Fisher, entitled "Nomenclature of Synthetic Rubbers," vol. 100, No. 6, India Rubber World, September 1939, as well as the natural rubber may also be used in the preparation of the matrix phase. These synthetic rubbers may be polymers of one or more of butadiene or butadiene compounds, such as butadiene-1,3, isoprene, haloprenes such as chloroprene (chlor - 2 - butadiene - 1,3), 2,3 - dichlorbutadiene-1,3, dimethyl butadiene, cyano-2-butadiene-1,3, and other materials containing conjugated, unsaturated linkages such as double bonds and preferably having four to seven or eight carbon atoms.

I prefer however, especially for forming the disperse phase, the copolymers of a major proportion of one or more such conjugated dienes, particularly butadiene and/or isoprene, with a minor proportion of one or more other polymerizable unsaturated materials, especially those containing a single aliphatic olefin or vinyl group, including aryl vinyl compounds such as styrene, alpha-alkyl styrenes, halogen-substituted aryl vinyl compounds such as mono- and dichlor-substituted styrenes having chlorine substituents either in the nuclear or aliphatic portion thereof and including meta-, ortho- or para-chlorostyrenes, 1,2-dichlorostyrene, etc., acrylic acid, acrylic acid, acrylic and methacrylic esters, such as ethyl acrylate, methyl acrylate, methyl methacrylate, etc., dimethyl-vinylethynlcarbinol, vinyl pyridine, and even the lower olefin hydrocarbons, such as isobutylene. Other materials, including methacrylylurea and vinyl ketones, substituted vinyl ketones, unsaturated, low molecular weight acids, such as fumaric acid, crotonic acid, their esters and amides, with or without polyhydric alcohols, mixtures of vinyl amide and phthalic anhydride or vinyl phthalamide, etc. may also be present in the monomeric mixture to modify the properties of the polymer.

It is of course understood that the separate ingredients of these complex rubbers, such as the dienes or the copolymerizable unsaturated compounds, may by themselves be partially but incompletely polymerized before being mixed with the other monomers without departing from the invention. Such partially polymerized dienes and olefins are herein designated and included by designating their respective monomeric substances.

It is to be noted that both the disperse phase and the matrix composition of the vulcanized articles of the present invention have properties of the general characteristic of soft vulcanized rubber. The variations in the respective proportions and number of the monomeric materials necessary for the attainment of such properties in the copolymer are almost infinite. It is well-known or apparent to those skilled in the art that one copolymerizable material may be substituted in whole or in part by another or by two or more others to obtain improvements in two or more specific properties. The total amount of conjugated dienes should usually constitute a major proportion (at least 50%) of the mixture of polymerizable unsaturated materials used in forming polymers. However, in some instances, as in the case of methylacrylate, etc., vulcanizable rubbery materials are obtained with a somewhat smaller amount (only 20% or 25%) of conjugated dienes, and in the case of Butyl rubber the amount of conjugated diene may be as low as 1% or even less to give the desired vulcanizability. It is generally preferred that the copolymerizable unsaturated materials be present in amounts between 10% and 40 or 45% of the monomeric mixture, the characteristics of copolymers of these materials and the effect of variations in quantities being well-known to those skilled in the art.

Although rubbery copolymers prepared from monomers containing conjugated dienes are preferred as the disperse phase and a highly flexible compound such as a carbon black-reinforced Hevea rubber compound is preferred as the matrix or continuous phase, the present invention is not restricted to any particular type of rubbery polymer for preparing either the disperse phase or the matrix compound. It is applicable to an infinite variety of rubbery polymers so long as these rubbery polymers are obtainable in the vulcanized and vulcanizable states. It may be desirable to vary the proportions of the polymerizable materials in the monomers used for preparing the rubbery polymers or to substitute the polymerizable materials by other polymerizable materials as they become available. The proportions and the number of ingredients polymerizable to a rubbery mass will be apparent to those skilled in the art.

The polymers in the compounds of the present invention should preferably be of the type which are vulcanizable either with sulfur or other agents capable of converting the material, with or without heat, from the plastic to the elastic state. Even rubbery products produced by condensation (rubbery condensation polymers), such for example as certain rubbery reaction products of dibasic acids, e. g. sebacic acid, with glycols, diamines and the like, especially when such rubbery polymers are vulcanizable by suitable cross-linking compounds, as well as vulcanizable olefin polysulfides, or Thiokol type rubbers, such for example as those set forth in application Serial No. 476,214 of T. A. Te Grotenhuis and G. H. Swart, filed February 17, 1943, now Patent Number 2,445,-191, may be used for some applications as the matrix of the compound or in finely divided form as the disperse phase of the compounds of the present invention. It is thus seen that the term "vulcanizable synthetic rubberlike material" as used herein in its broadest scope is entitled to include sulfur-vulcanizable synthetic rubbers, as well as other synthetic vulcanizable materials of a rubbery resilience characteristically resembling after vulcanization a soft vulcanized natural rubber.

Although halogen-substituted dienes, such for example as chloroprene (chloro-2-butadiene-1,3) do not polymerize into a rubber generally considered capable of being reinforced by carbon black, the latter material does stiffen and improve the characteristics of polychloroprene compounds. These holoprenes, particularly chloroprene, are advantageous however in that they may be readily cross-linked by polymerization to a state resembling vulcanized or cured rubber without the addition of curing agents.

When the rubberlike particles of the two or more lactices utilized in preparing the heterogeneous mixtures of the present invention are not strongly adherent, as for example when one of the rubbery polymers of one of the latices contains a substantial quantity of halogen, nitro or nitrile, substituents in the aliphatic chain, and the rubbery polymer of the other latex is a hydrocarbon, it is often desirable to suitably incorporate in the mixture a polymerizable liquid or semi-solid paste capable of being further converted to a rubbery polymer. Such polymerizable material by further polymerization of the matrix compound tends to strengthen the bonds between the dispersed globules in the matrix compounds so that they are not readily displaced or removed bodily by abrasion, especially when the polymerizable polymers or plasticizers are prepared from a monomeric mixture intermediate in hydrocarbon content between the disperse phase and the matrix compound. They also tend to soften or plasticize the interface between the disposed phase and continuous phase so that there is a gradual transition in hardness. Thus, when it is desired to utilize a natural rubber as the main rubbery base of the matrix composition and utilize as a disperse phase a less plastic, relatively tough copolymer of butadiene and acrylonitrile prepared from monomer having a relatively large proportion of acrylonitrile, it is preferable to use as a plasticizer a syrupy or semi-solid copolymer having a sufficiently small amount of acrylonitrile to be compatible with the natural rubber.

The polymerizable liquid plasticizer used may be prepared by partially polymerizing one or more suitable monomeric materials, partial polymers, or mixtures thereof, to obtain a relatively non-volatile polymer which may be a relatively syrupy, gellike or viscous liquid, or preferably a semi-solid, or mixtures of the same. It may be mixed with carbon black prior to its admixture with the ingredients forming the matrix. Thus, for example, it may be prepared by polymerizing butadiene or other polymerizable materials, or a mixture of carbon black and butadiene, homologues and/or analogues thereof, with or without a copolymerizable unsaturated material, until a relatively non-volatile liquid or a liquid of syrupy consistence, as illustrated in Example 1 of British Patent 328,212 of May 8, 1930, is obtained.

To insure the strongest bond between the disperse phase of the latex, the predominant plasticizer should preferably be a liquid polymerizable to a rubberlike polymer of the same type as that of the disperse phase; plasticizers containing the same monomer as utilized in preparing the disperse phase are preferred. The polymerizable plasticizers are preferably mixed with the more plastic latex in liquid or emulsion form.

The latices utilized in forming the heterogeneous mixtures may or may not carry the same charge on the particles thereof. But, in order to insure complete dispersion of the less plastic disperse phase within the more plastic matrix particles, it is preferred that at least two of the latices carry opposite charges, one of the latices carrying positive charges and another carrying negative charges, so that particles of agglomerate formed by admixture of the latices comprise both positive and negatively produced particles of rubbery polymer.

In making the admixture, it is usually desirable that the pH of the latices be as near neutral as possible without effecting coagulation. By utilizing substantially neutral latices, they may usually be added in any desired proportion. By increasing the charge on the particles of rubbery polymer in the positive latex, as for example by incorporating a small amount of heavy metal such as barium chloride, aluminum chloride, aluminum sulfate, etc. having a polyvalent cation, the coagulum produced from the mixture will comprise rubbery particles of the positive latex completely surrounded by particles of the negative latex.

When the separate latices prior to the admixture are compounded as desired by suitably incorporating therein a dispersion of desired vulcanizing ingredients, carbon black, etc., intimate combination of the ingredients may be had, especially when the rubbery material of one latex is more plastic than the other, as above described. Subsequent mastication of the coagulum thus formed may be had without appreciable deterioration of the more rigid or less plastic dispersed particles of rubbery polymer.

The compounded heterogeneous latex mixture, containing substantial amounts of carbon black dispersed therein, may be coagulated in any desirable manner or even coagulated in the desired form directly from the latex.

The relative proportions of the plastic and less plastic rubber compounds in the heterogeneous compounds may be varied substantially. About equal proportions are oftentimes most desirable. When the more plastic rubbery compound does not contain substantial amounts of carbon black, it is usually found that a somewhat lesser proportion is required in the compound to provide the desired flexibility. When the proportion of the tougher and more wear-resistant rubbery material is increased, the heat build-up due to flexing is usually increased and the abrasion resistance is increased.

The coagulum may be extruded, calendered or molded to any desired shape without causing appreciable breakdown of the substantially less plastic rubbery material. The moisture content should ordinarily be greater than .5% and preferably greater than 1% at the time of shearing by extrusion or by rolls. It is preferred that the substantially unmasticated coagulum be formed by extrusion under high pressure through small orifices into a forming cavity which has the general contour of the usual uncured tread as applied to drum-built pneumatic tire carcasses.

The rubber compound, when suitably formed by calendering or upon removal from a preforming mold, may be applied as a portion of the tread of a tire, as for example that shown in Anderson Reissue Patent 20,431, or it may be formed or vulcanized with the aid of heat and pressure to an elastic state characteristic of soft vulcanized rubber.

The following Examples 1 and 2, in which parts are by weight, illustrate the formation of type A compounds wherein the stiffening or hardening of the disperse phase is by polymerization.

*Example 1*

A latex of relatively tough, unmodified rubbery polymer is prepared by polymerizing to a high yield a mixture of about 75 parts of butadiene and 25 parts of styrene with constant agitation in an aqueous solution of about 5 parts of sodium oleate, containing about .3 part of potassium cobaltinitrite, .4 part of potassium persulfate, and .05 part of dodecyl mercaptan to act with the cobaltinitrite as a polymerization activator. The latex thus obtained is mixed with a highly modified latex, obtained by polymerizing to relatively low yield (about 60% solids) the same mixture of monomers in the same aqueous solution, except that it contains about 1 part of dodecyl mercaptan to promote the formation of a plastic copolymer. The mixture thus obtained may be compounded with carbon black, and vulcanizing ingredients. The mixture thus obtained is coagulated and dried to about 1% to 3% moisture content and then injected through relatively fine orifices to a preforming mold to cause smearing of the black particles and formation of the more plastic polymer into a matrix for the less plastic material.

*Example 2*

When a latex of a relatively tough rubbery polymer is compounded with curing agents and partially cured previous to admixture with the compounded latex of the relatively plastic polymer of the preceding example, a heterogeneous compound having desirable properties is also obtained, even though substantial mastication has preceded the shaping operation.

The monomers of the above examples may be substituted by other monomers or mixtures of the same, as set forth above and known or found by those skilled in the art, to produce a vulcanized or vulcanizable rubbery polymer resembling after vulcanization a soft, vulcanized natural rubber. The respective quantities of the copolymerizable monomeric ingredients may of course be varied widely, still retaining vulcanizability and a rubbery product.

The following example, in which parts are by weight, illustrates the formation of type B compounds at the present invention wherein the stiffening of the disperse phase is caused by carbon black.

Example 3

Into about 300 parts of GR—S latex (33% rubber) is incorporated with stirring about 70 parts of W-6 carbon black, which was dispersed in about 300 parts of water containing about 7 parts of daxad, about 5 parts of a 20% dispersion of Santocure, about 25 parts of a 20% aqueous dispersion of zinc oxide, and about 10 parts of a 20% dispersion of sulfur. The compounded latex thus had is then coagulated with alum while being stirred at high speed to produce a very fine crumb of compounded GR—S rubber, which is then washed to remove a major portion of the excess alum. The wet mass thus obtained is then stirred into 300 parts of 33%-GR—S or natural rubber latex, preferably suitably compounded with about 15 or 20 parts or so of carbon black, 1 part sulfur, 1 part accelerator, 10 parts of zinc oxide and 10 parts of softener, all in the form of an aqueous dispersion. The mixture thus formed is coagulated with additional aluminum chloride, washed and dried to about 2% moisture, whereupon it is passed only twice through squeeze rolls to smear any lumps of carbon black, and then extruded directly into tire threads having exceptional properties.

In the above example, either or both of the GR—S latices may be substituted by natural latex or one or more other vulcanizable synthetic rubber latices, preferably sulfur-vulcanizable. The proportions of the compounding ingredients may be varied widely, although it is highly desirable that a much higher percentage of carbon black be present in the preagglomerated latex which forms the disperse phase of the compound, so that it has the highest wear resistance.

The disperse phase in the above examples may be substituted by unmasticated, tough polychloroprene particles which, when internally stiffened with carbon black that is polymerized in situ, may or may not have been polymerized to the cross-linked or tough state resembling vulcanized rubber; or it may be substituted by other finely divided, tough, unmasticated synthetic rubbery polymers, which may be prepared from one or more of the monomeric materials such as those above set forth.

The amount of carbon black is preferably substantially in excess of 10% or 15% of the rubber-like material in both phases. With larger amounts, such as 40% to 60% or 70% in the disperse phase, abrasion resistance is usually considerably improved. When the carbon black is incorporated in the latex in substantial amounts, as in excess of 20% or 30% or so, it is essential for the preparation of a matrix compound that the compound be subjected to a shearing or deforming treatment as large amounts of carbon black incorporated other than within the globules of the rubberlike material of the latex tend to prevent formation of any continuous phase upon coagulation of the mixture. Since such carbon black also tends to agglomerate upon coagulation, it is desirable that the rubbery polymers contain at least .2% and preferably in excess of .5% or 1% of water to facilitate effective dispersion of the carbon black when the mixture is subjected to a shearing or forming treatment.

The proportion of the less plastic polymer within the heterogeneous compounds of the present invention depends largely upon the particle size thereof. The proportion should not be so large that the particles cannot be bound together by the matrix compound of more plastic materials. The greatest abrasion resistance is usually obtained when the amount of the matrix is just sufficient to fill the spaces between particles of comminuted materials which are packed together or are substantially in contact.

In a gel, such for example as a gel formed by mixing gelatine and water, the water phase is considered to be continuous and the gelatine phase is considered to be continuous. Both of these phases extend throughout the volume of the other. One may be said to be coextensive with the other. It is because of the fact that the two phases, the gelatine and water phases, are coextensive, i. e. each extends continuously throughout the volume of the other, that the product has rigidity. If the aforementioned hard, tough, rubbery polymer should be completely interlocked with the relatively soft rubbery polymer as in the case of the gel, so that both of these materials extend as continuous phases throughout the entire volume of the other, only a tough material, processable with difficulty, is produced. In the product of the present invention, the hard, tough polymeric material being formed in latex necessarily exists as particles. It does not extend as a continuous phase throughout the entire volume of the soft polymer as in the case of a homogeneous gel.

In the claims, the terms "noncoextensive" or "not coextensive" and "free of intermingling high polymerization product" have been used sometimes to make it clear that a substantial proportion of the relatively plastic polymerization product is relatively free of a continuous phase of intermingling, tough polymerization product, so that the tough polymerization product does not make the relatively plastic polymerization product rigid.

The term "polymer" is used in the appended claims in a generic sense to include copolymers. The terms "modifier," "modifying agent" and "cross-linking inhibitor of polymerization" are used synonymously to designate those materials generally classed as polymerization modifiers in the various technical reports circulated by the Rubber Reserve Corporation.

The term "soft vulcanized rubber" is used in accordance with conventional practice to distinguish from hard rubber (hard vulcanized rubber or high sulfur rubber) and designates rubber vulcanized to the flexible, resilient, elastic or rubbery state, generally characteristic of rubber compounds of pneumatic tires, etc. having low rubber-sulfur ratios.

The term "coagulum of a latex" designates the solids precipitated from a latex or aqueous dispersion of rubber by any procedure, including drying or removal of water.

Although the invention may be employed in various ways, only preferred embodiments have been illustrated and described. Other embodiments may be made within the invention as provided by the patent statutes.

What I claim is:

1. A latex comprising an aqueous dispersion of an unmasticated polymerization-cross-linked polymerization product of a liquid comprising butadiene and styrene as main polymerizable constituents and of a polymerization product having relatively few cross links and of a liquid comprising butadiene and styrene as main polymerizable ingredients, said polymerization-cross-linked product being relatively tough and having a high resistance to plastic flow compared to said polymerization product having relatively few cross links, the mass of said polymerization-cross-linked polymerization product being at least equal to the mass of said product having relatively few cross links, a substantial proportion of said product having relatively few cross links being relatively free of a continuous phase of relatively tough product, whereby upon mastication of the dried coagulum from said latex the polymerization product having relatively few cross links being more plastic than the cross-linked product coalesces into a matrix having particles of the relatively tough polymerization - cross - linked product distributed therethrough, said dried coagulum being vulcanizable to the resilient state generally characteristic of vulcanized soft rubber.

2. A latex comprising an aqueous dispersion of an unmasticated synthetic polymerization-cross-linked polymerization product of a liquid comprising a conjugated diolefine having up to 8 carbon atoms as a main polymerizable constituent and of an unmasticated polymerization product having relatively few cross links and of a liquid comprising a conjugated diolefine having up to 8 carbon atoms as a main polymerizable ingredient, said polymerization-cross-linked product being relatively tough and having a high resistance to plastic flow compared to said polymerization product having relatively few cross links, the mass of said polymerization-cross-linked polymerization product being at least equal to the mass of said product having relatively few cross links, a substantial proportion of said product having relatively few cross links being relatively free of intermingling relatively tough product, whereby upon mastication of the dried coagulum from the latex the polymerization product having relatively few cross links being more plastic than the polymerization-cross-linked product coalesces into a matrix having separate particles of the relatively tough polymerization-cross-linked product distributed therethrough.

3. A latex comprising an aqueous dispersion of an unmasticated polymerization - cross - linked polymerization product of a liquid comprising a conjugated diolefinic compound having 4 to 8 carbon atoms and a copolymerizable arylvinyl compound as main polymerizable constituents and of a plastic polymerization product having relatively few cross links and of a liquid comprising a conjugated hydrocarbon diolefinic compound of 4 to 8 carbon atoms and a copolymerizable arylvinyl compound as main polymerizable ingredients, said polymerization-cross-linked product being relatively tough and having a high resistance to plastic flow compared to said polymerization product having relatively few cross links, the mass of said polymerization-cross-linked polymerization product being at least equal to the mass of said product having relatively few cross links, a substantial portion of said relatively plastic product having relatively few cross links being relatively free of intermingling relatively tough product, whereby upon mastication of the dried coagulum from the latex, separate particles of the polymerization-cross-linked product are distributed through a continuous phase of coalesced particles of the product having relatively few cross links.

4. A latex comprising an aqueous dispersion of an unmasticated polymerization - cross - linked polymerization product of a liquid comprising a conjugated diolefine of less than 8 aliphatic carbon atoms and a mono-olefinic compound copolymerizable therewith as main polymerizable constituents and of a polymerization product having relatively few cross links and of a liquid comprising a conjugated diolefinic compound of less than 8 carbon atoms and a mono-olefinic compound copolymerizable therewith as main polymerizable ingredients, said polymerization-cross-linked product being relatively tough and having a high resistance to plastic flow compared to said polymerization product having relatively few cross links, both products when vulcanized having resilience generally characteristic of vulcanized rubber, said polymerization-cross-linked product being not coextensive with the product having relatively few cross links, whereby upon mastication of the dried coagulum from the latex, separate particles of the polymerization-cross-linked product are distributed through a continuous phase of coalesced particles of the product having relatively few cross links.

5. A method of making a heterogeneous compound having particles of a compound of relatively high wear resistance distributed within a matrix of another compound having less abrasion resistance and less heat build-up from flexing, which comprises intimately mixing carbon black into a latex of a polymer of a conjugated diolefine which when vulcanized is rubberlike, agglomerating the rubber and carbon black together to produce particles containing carbon black in intimate association with said rubber, said carbon black being present in sufficient amount to form relatively stiff particles, mixing said particles into a latex of a polymer of a diolefine containing carbon black which when coagulated and dried gives a coagulum that is softer and more plastic than the above-mentioned particles, coagulating the mixture, and at least partially drying and forming the coagulum into a desired shape.

6. A masticated plastic compound vulcanizable to the rubber-like state and comprising a vulcanizable plastic matrix having dispersed therethrough particles of an unmasticated copolymerization product of a material comprising a polymerizable conjugated diolefinic compound of less than 8 carbon atoms and a mono-olefinic compound copolymerizable therewith, said copolymerization product being a highly cross-linked polymer and being present in amounts as great as said matrix, said matrix being a polymerization product of a mixture comprising a conjugated diolefinic compound of less than 8 carbon atoms and a copolymerizable mono-olefinic compound and being a noncross-linked to relatively slightly cross-linked polymer.

7. The method of making a mass of polymeric material vulcanizable to the rubberlike state, comprising forming a mixed aqueous dispersion of (a) particles of a vulcanizable unmasticated polymerization product of a material comprising a polymerizable conjugated diolefine of less than 8 aliphatic carbon atoms and a mono-olefinic compound copolymerizable therewith, which polymerization product is in the relatively highly polymerization-cross-linked state as evidenced by a relatively great toughness or relatively high degree of resistance to plastic flow, and (b) particles of an unmasticated plastic vulcanizable polymer of a polymerizable conjugated diolefinic compound of less than 8 aliphatic carbon atoms, which polymer has relatively few cross links as evidenced by relatively low resistance to plastic flow compared to said polymerization-cross-linked product, coagulating the polymeric particles of said mixed aqueous dispersion and drying the coagulum, whereby subsequent mastication of the mixed particles will cause the more plastic material having relatively few cross links to be in a continuous phase and will cause easier processing because of permitted bodily movement of the relatively tough particles of relatively highly cross-linked polymerization product within said continuous phase of the more plastic polymer, said plastic polymer being one modified and polymerized by catalyzing and maintaining a liquid comprising said diolefinic compound in emulsion in a mixture comprising water, an emulsifying agent and a modifier to inhibit cross-linking of polymers of conjugated diolefines.

8. A method of making an easily processable mass of rubbery material which when vulcanized is rubberlike, which comprises forming a mixture of an aqueous dispersion of an unmasticated synthetic polymerization product obtained by polymerizing a liquid comprising a conjugated diolefine having less than 8 aliphatic carbon atoms to a relatively tough polymer, said polymerization being accomplished by catalyzing and maintaining said liquid in emulsion in a mixture comprising water and an emulsifying agent until said tough polymer is formed, and a dispersion in an aqueous liquid of a relatively more plastic unmasticated synthetic emulsion polymer of a conjugated diolefine of less than 8 carbon atoms, which polymer is one modified to be a relatively plastic, vulcanizable polymeric material, and coagulating the dispersed materials together and masticating the coagulum, a substantial proportion of said relatively plastic polymer being free of intermingling relatively tough polymerization product, whereby the material produced is processable with ease relative to coagulum from said tough polymeric material alone due to the easy bodily movement of the relatively tough particles within the more plastic material which forms the continuous phase.

9. A method of making an easily processable mass of a rubberlike polymerization product of monomeric materials, consisting chiefly of butadiene and styrene; which comprises polymerizing part of said monomeric materials to a relatively tough cross-linked polymer; and polymerizing another portion of said monomeric materials in the presence of a cross-linking inhibitor to a relatively plastic, vulcanizable, polymeric material that is curable to the resilient state generally characteristic of vulcanized soft rubber; said polymerizations being accomplished by catalyzing and maintaining the monomeric materials in emulsion in water containing an emulsifying agent until the polymers are produced; coagulating a mixed aqueous dispersion of said tough cross-linked polymer and said relatively plastic polymeric material; and drying the coagulum; the mass of the relatively tough cross-linked polymeric material being at least equal to the mass of said relatively plastic polymeric material, and the mass of said relatively plastic polymeric material being in sufficient proportion to bind the separate particles of said relatively cross-linked polymeric material together, as indicated by relative ease of processing said coagulum as compared with coagulum of said tough polymeric material alone, said ease of processing being produced by the easy bodily movement of separate particles of the relatively cross-linked polymeric material within the relatively plastic polymeric material which forms a continuous phase.

10. A method of making an easily processable mass of a rubberlike polymerization product of monomeric materials, comprising a polymerizable conjugated diolefinic compound of 4 to 8 carbon atoms in a straight chain as a main polymerizable constituent; which comprises polymerizing part of said monomeric materials to a tough cross-linked state, and polymerizing another portion of said monomeric materials in the presence of a cross-linking inhibitor in order to create a relatively plastic polymeric material that is vulcanizable to the resilient state generally characteristic of soft vulcanized rubber; said polymerization being accomplished by catalyzing and maintaining said monomeric materials in emulsion in a mixture comprising water and emulsifying agent until the polymers are formed; coagulating a mixed aqueous dispersion of the tough cross-linked polymer and the relatively plastic polymeric material; and drying the coagulum; the mass of the tough cross-linked polymeric material being at least equal to the mass of the relatively plastic polymeric material, and the mass of the relatively plastic polymeric material being in sufficient proportion to bind the particles of the tough cross-linked polymeric material together, as indicated by relative ease of processing said coagulum as compared with coagulum of said tough polymeric material alone, said ease of processing being produced by the easy bodily movement of particles of the relatively cross-linked polymeric material within the more plastic polymeric material which forms a continuous phase.

11. A coagulum from a latex comprising (a) a substantial proportion of unmasticated particles of a copolymer of butadiene and styrene, which copolymer is relatively highly cross-linked as evidenced by toughness and high resistance to plastic flow, and (b) a relatively plastic copolymer of a material containing butadiene and styrene in which conjugated diolefinic compounds are at least 50% of the polymerizable materials, which relatively plastic copolymer is one modified during polymerization to inhibit cross-linking and thus give increased plasticity, said coagulum when dry being characterized by being readily deformable, millable, and extrudable due to bodily movement of said tough cross-linked particles through a matrix formed of said relatively plastic copolymer.

12. A coagulum of a latex comprising (a) particles of an unmasticated copolymer of a conjugated diolefine having less than 8 aliphatic carbon atoms and an aryl-substituted mono-olefinic compound copolymerizable therewith, which copolymer is polymerized to a relatively tough hard state, and (b) particles of a comparatively plastic copolymer of a conjugated diolefine having less than 8 aliphatic carbon atoms and an aryl-substituted mono-olefinic compound copolymerizable therewith, said comparatively plastic copolymer being vulcanizable to the elastic state generally characteristic of soft vulcanized rubber and being an emulsion copolymer modified by a cross-linking inhibitor during polymerization, a substantial portion of particles of said relatively plastic copolymer being relatively free of a continuous phase of intermingling relatively tough copolymer, whereby on mastication of the dried coagulum from said latex the particles of relatively plastic copolymer being more plastic and more easily deformed than the tough product coalesce into a continuous matrix having the separate particles of tough copolymer distributed therethrough.

13. A masticated coagulum of a latex comprising particles of a rubbery copolymer of a conjugated diolefinic compound having less than 8 aliphatic carbon atoms and a copolymerizable mono-olefinic compound, which copolymer is polymerization-cross-linked to the relatively tough difficultly processable state and particles of a copolymerization product of a conjugated diolefinic compound having less than 8 aliphatic carbon atoms and a copolymerizable mono-olefinic compound, which copolymerization product has relatively few cross links and is a relatively plastic copolymer vulcanizable to the resilient state generally characteristic of soft vulcanized rubber, said copolymers being not coextensive whereby said coagulum when dry is readily plastically deformable under mechanical stress as a result of bodily movement of the finely divided, dispersed, relatively tough particles through a matrix formed of the relatively plastic copolymer.

14. A latex coagulum that is suitable for mastication and shaping into rubberlike molded articles comprising particles of an unmasticated polymer of a material comprising a conjugated diolefinic compound of less than 8 aliphatic carbon atoms polymerized to the tough and highly cross-linked polymeric state and a matrix-forming body of plastic polymer of a conjugated diolefinic compound of less than 8 aliphatic carbon atoms, which plastic polymer is one modified to have relatively few cross links by accomplishing polymerization of the diolefinic compound thereby by maintaining it in emulsion in water in the presence of an emulsifying agent, polymerization catalyst and a modifier but is vulcanizable to the elastic state generally characteristic of vulcanized, soft rubber compounds, a substantial proportion of said product having relatively few cross links being relatively free of a continuous phase of intermingling relatively tough product, whereby relatively easy processing of the coagulum is had.

THEODORE A. TE GROTENHUIS.

REFERENCES CITED

The following references are of record in the file of this patent:

UNITED STATES PATENTS

| Number | Name | Date |
|---|---|---|
| 1,611,278 | Petersen | Dec. 21, 1926 |
| 1,906,667 | Tschunkur et al. | May 2, 1933 |
| 1,952,041 | Murphy | Mar. 20, 1934 |
| 2,239,659 | Bradley | Apr. 22, 1941 |
| 2,354,424 | Novotny | July 25, 1944 |
| 2,378,717 | Macey | June 19, 1945 |
| 2,386,583 | Bacon | Oct. 9, 1945 |

FOREIGN PATENTS

| Number | Country | Date |
|---|---|---|
| 328,812 | Great Britain | May 8, 1930 |